(12) United States Patent
Shimomura et al.

(10) Patent No.: US 6,713,128 B2
(45) Date of Patent: Mar. 30, 2004

(54) ALKYLSILOXANE-CONTAINING EPOXY RESIN COMPOSITION, SURFACE MODIFYING METHOD USING THE SAME, INK-JET RECORDING HEAD AND LIQUID-JET RECORDING APPARATUS

(75) Inventors: Akihiko Shimomura, Yokohama (JP); Hiromichi Noguchi, Hachioji (JP); Isao Imamura, Kawasaki (JP); Tamaki Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/389,931

(22) Filed: Mar. 18, 2003

(65) Prior Publication Data

US 2003/0181623 A1 Sep. 25, 2003

Related U.S. Application Data

(62) Division of application No. 09/664,750, filed on Sep. 19, 2000, now Pat. No. 6,586,495.

(30) Foreign Application Priority Data

Sep. 20, 1999 (JP) ............................................ 11-266230

(51) Int. Cl.[7] .................................................. B05D 7/26
(52) U.S. Cl. ........................ 427/273; 427/272; 427/271; 427/503; 427/504; 427/510; 427/511; 427/515; 29/890.1; 430/260; 347/45; 347/47
(58) Field of Search ................................. 427/273, 272, 427/271, 503, 504, 510, 511, 515; 29/890.1; 430/260; 347/45, 47

(56) References Cited

U.S. PATENT DOCUMENTS

| | | |
|---|---|---|
| 4,688,052 A | 8/1987 | Inamoto et al. |
| 4,688,053 A | 8/1987 | Noguchi et al. |
| 4,689,640 A | 8/1987 | Shimomura |
| 4,839,668 A | 6/1989 | Sato et al. |
| 4,839,669 A | 6/1989 | Sato et al. |
| 4,970,532 A | 11/1990 | Komuro et al. |
| 5,086,307 A | 2/1992 | Noguchi et al. |
| 5,451,992 A | 9/1995 | Shimomura et al. |
| 5,510,818 A | 4/1996 | Shimomura et al. |
| 5,524,784 A | 6/1996 | Shiba et al. |
| 5,650,805 A | 7/1997 | Shimomura et al. |
| 5,663,752 A | 9/1997 | Imamura et al. |
| 5,738,911 A | 4/1998 | Imamura et al. |
| 5,750,587 A | 5/1998 | Manzouji et al. |
| 5,770,271 A | 6/1998 | Imamura |
| 5,980,017 A | 11/1999 | Sato |
| 5,980,026 A | 11/1999 | Imamura et al. |
| 5,998,501 A | 12/1999 | Tsutsumi et al. |
| 6,291,545 B2 | 9/2001 | Imamura |
| 6,409,931 B1 | 6/2002 | Shimomura et al. |
| 6,484,399 B2 | 11/2002 | Aono et al. |
| 6,586,495 B1 * | 7/2003 | Shimomura et al. ........ 522/112 |

FOREIGN PATENT DOCUMENTS

| | | |
|---|---|---|
| EP | 0 733 637 A1 | 9/1996 |
| EP | 0 739 945 A2 | 10/1996 |
| EP | 0 842 996 A1 | 5/1998 |
| EP | 0 942 024 A2 | 9/1999 |
| JP | 2-039944 | 2/1990 |

* cited by examiner

*Primary Examiner*—Margaret G. Moore
(74) *Attorney, Agent, or Firm*—Fitzpatrick, Cella, Harper, Scinto

(57) ABSTRACT

An alkylsiloxane-containing epoxy resin composition can suitably be used as water-repellent agent or a water-repellent coating to be advantageously applied to areas that are apt to be brought into contact with solutions and substances containing one or more than one components that can damage the film forming property and the adhesion of an ordinary water-repellent agent. The resin composition comprises at least an alkylsiloxane-containing epoxy resin having two or more than two alkylsiloxane groups and two or more than two cyclic aliphatic epoxy groups in a molecule and a cationic polymerization catalyst.

10 Claims, 3 Drawing Sheets

ALKYLSILOXANE-CONTAINING EPOXY RESIN COMPOSITION, SURFACE MODIFYING METHOD USING THE SAME, INK-JET RECORDING HEAD AND LIQUID-JET RECORDING APPARATUS

This application is a division of application Ser. No. 09/664,750, filed Sep. 19, 2000, now U.S. Pat. No. 6,586,495.

BACKGROUND OF THE INVENTION

1. Field of the Invention

This invention/relates to a resin composition adapted to treat the surface of a material so as to make it water- and ink-repellent and, more particularly, to a photocurable epoxy resin composition adapted to form a patterned film coat by irradiating ultraviolet rays. More specifically, the present invention relates to an alkylsiloxane-containing epoxy resin composition and to a surface modifying method for treating the surface of a base material by using such a composition as well as to a liquid-jet recording head treated for ink-repellence and also to a liquid-jet recording apparatus using such a recording head.

2. Related Background Art

Methods for modifying the surface of a base material that needs to be water-resistant or ink-repellent in order to make it to be satisfactorily so by applying a water-repellent paint thereto are widely known in various industrial fields and a variety of resin materials and paints have been developed for this purpose. For instance, fluoroolefins and fluorine-containing paints having one or more than one perfluoro-groups in a molecule are thermally and chemically highly stable and also remarkably resistant against weather, water, chemicals and solvents. Additionally, they show good mold release characteristics, a good abrasion resistance and a good water repellency so that they find applications in various fields.

Meanwhile, liquid-jet recording heads adapted to eject liquid droplets through small ejection ports and cause them to adhere to a recording medium such as a sheet of paper so as to record or form an image thereon are recently required to be able to eject smaller liquid droplets, be driven with a higher head oscillation frequency and have a greater number of nozzles in order to achieve a higher level of performance. Therefore, such a recording head is required than ever to have a nozzle surface that is treated and modified in order to be maintained in a same state.

However, according to the results of intensive research efforts of the inventors of the present invention, it is difficult to accurately treat the surface of a nozzle selectively or in the form of a pattern by using any known materials so that ink may not adhere thereto. This is because firstly, while a substance having one or more than one photosensitive functional groups in a molecule has to be used as surface treatment material for treating the surface of the nozzle in the form of a pattern so that it may operate like photoresist, it is highly difficult to design a molecule having such groups and showing a water-repellent/ink-repellent effect at the same time.

Secondly, if the surface of the nozzle can effectively be treated by means of a known fluorine-containing substance, the film coat of the substance is required to show a structure that can maintain the treated condition of the surface for a prolonged period of time. If such a substance is available and can be used to treat the surface of a nozzle in the form of a pattern, it will be highly valuable for treating an ink-jet printing head for the reasons pointed out below.

In an ink-jet recording system of ejecting droplets of ink through nozzles for recording, it is highly desirable that the ejection ports (openings) of the system have the following characteristic features.

(1) The remaining part of the ink column formed outside the nozzle that has been turned to droplets are quickly put back into the nozzle.
(2) The ink droplets adhering to the surface can easily be wiped away by a cleaning operation.
(3) The surface is hardly scraped or damaged because of the rub resistance of the surface when they are wiped away in a cleaning operation or when the recording paper is moved along the surface.
(4) A meniscus is formed at the surface position of the nozzle in the repeated process of droplet formation and ink refill.
(5) The direction of the normal to the meniscus agrees with that of the droplet ejection.
(6) The interfacial tension and hence the contact angle of the ink has to be large enough for forming a meniscus if the ink shows low surface tension or under low negative pressure.

The reason why the above listed so many features are required for the ejection ports is that, if recording liquid such as ink adheres to and near the ejection ports, the direction in which the liquid droplets ejected from the ejection ports of the liquid-jet recording head fly can become diverted to make it difficult to print highly accurately and degrade the printing performance of system. Means have been proposed to make the surface of an ejection port and its vicinity repellent to liquid in order to prevent liquid from adhering to the ejection port and its vicinity to make the liquid droplets ejected therefrom to be diverted from the right direction. For example, Japanese Patent Application Laid-Open No. 2-39944 discloses a method of treating the surface of the ejection port by means of a polymer material having fluoroacetyl groups and silazane groups in order to make it repellent to ink.

Meanwhile, as a result of the increasing demand for sophisticated printers utilizing liquid-jet recording systems for recording images, the recording liquid to be used for such recording systems is also required to show sophisticated characteristic features. More often than not, the recording liquid to be used for such recording systems is chemically regulated so as to be basic with a pH value between 7 and 11 in order to make it stable. Then, the printer members that may be brought into contact with the recording liquid are required to be highly resistant against alkali and hydrolysis.

However, if a recording liquid containing a polar organic solvent is used with the water-repellent agent and/or the recording solution shows such a high pH value, the water-repellent agent applied to the surface of the ejection port in order to satisfy the above requirements can damage the film forming property of the agent and the tight adhesion of the agent relative to the surface of the ejection port as it comes to contact with the solvent of the recording liquid and the polar organic solvent used for the recording liquid. Then, the coat of the water-repellent agent can be peeled off to lose the water repellence of the surface.

SUMMARY OF THE INVENTION

Therefore, it is an object of the present invention to provide a siloxane-containing epoxy resin composition that can be suitably used for a water-repellent agent or a water-repellent coating to be applied to an area of a member that can be brought into contact with one or more than one solutions and/or materials such as polar organic solutions that can damage the film-forming effect and the adhesion of the water-repellent agent. It is another object of the present invention to provide a siloxane-containing epoxy resin composition adapted to surface modifying treatment for maintaining the treated surface constantly in a same state. Still another object of the present invention is to provide an ink-jet recording head and a liquid-jet recording apparatus having a printing head whose nozzle surface is free from adhesion of ink as the surface of the base material of the head is treated by a siloxane-containing epoxy resin composition. Such an ink-jet printing head and a liquid-jet recording apparatus provide the advantage that the surface of the printing head is free from adhesion of ink if held in contact with recording liquid (ink) for a prolonged period of time so that consequently the ink droplets shot out of the printing head show excellent impact precision and provide an excellent printing quality.

According to the invention, the above objects and other objects of the invention can be achieved by providing an alkylsiloxane-containing epoxy resin composition containing at least an alkylsiloxane-containing epoxy resin having two or more than two alkylsiloxane groups and two or more than two cyclic aliphatic epoxy groups in a molecule and a cationic polymerization catalyst, in particular, wherein the alkylsiloxane-containing epoxy resin is a cyclic aliphatic epoxy resin (A) having a structural unit expressed by general formulas (a) and (b) below. In other aspects of the present invention, there are provided a surface modifying method, an ink-jet recording head and a liquid-jet recording apparatus using such an alkylsiloxane-containing epoxy resin composition.

(A)

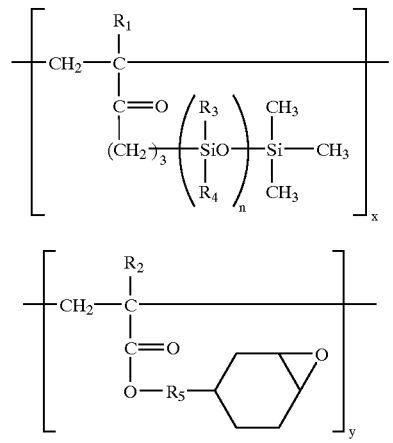

wherein
x=1 to 50, y=2 to 100, n is an integer of 2 to 100,
$R_1$ and $R_2$ are independently H or $CH_3$,
$R_3$ and $R_4$ are independently $CH_3$ or phenyl,
$R_5$ is $CH_2$, —$CH_2CH_2$— or —$CH_2CH(CH_3)$—.

DESCRIPTION OF THE PREFERRED EMBODIMENTS

Figure 1:
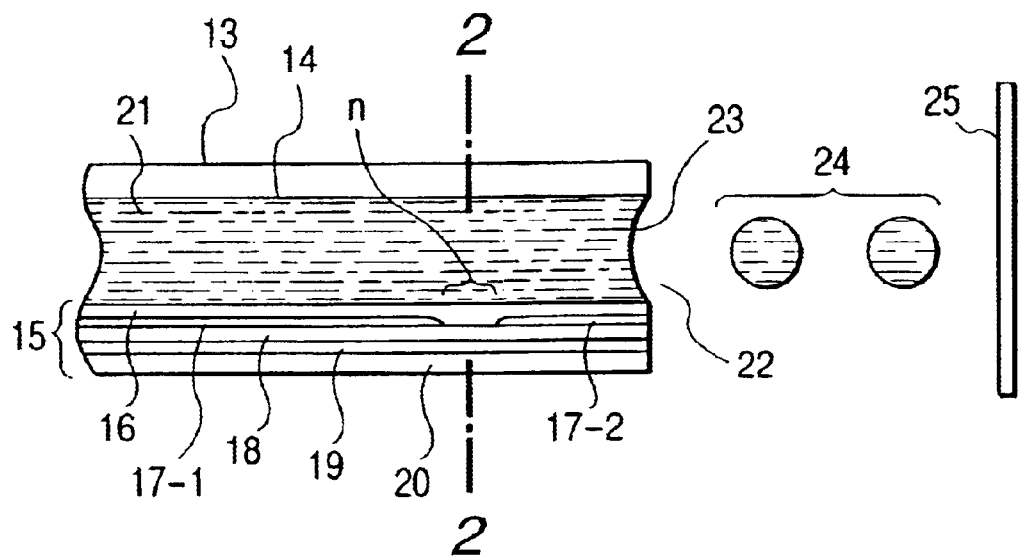
FIG. 1 is a schematic longitudinal cross sectional view of the head of an ink-jet recording apparatus taken along the ink flow path of the head.

Now, the present invention will be described in greater detail by referring to the accompanying drawings that illustrate preferred embodiments of the invention.

A specific example of the polymeric compound (A) above is compound (A-1) having a structural unit expressed by formulas (a-1) and (b-1) below.

(A-1)

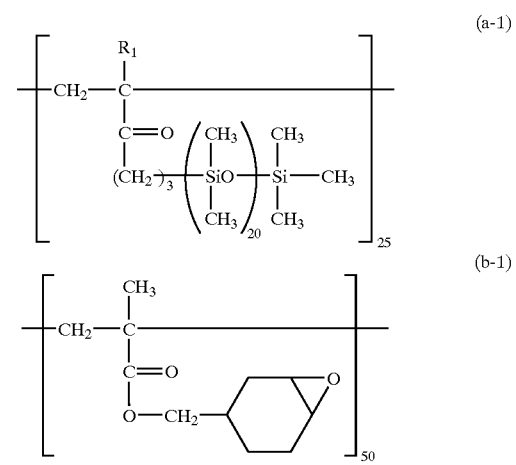

Whenever necessary, an alkylsiloxane-containing epoxy resin composition according to the invention and containing the polymeric compound (A) may additionally contain as compatibilizer a compound expressed by general formula (B) below.

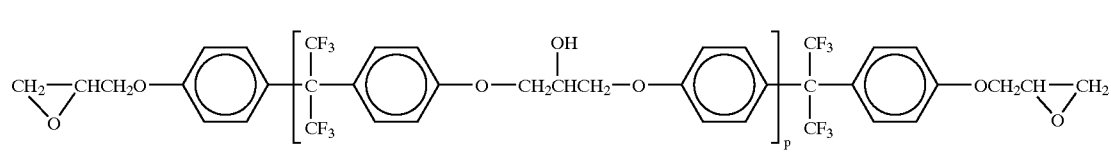

(where p is an integer of 0 to 2)

Specific examples of the compound (B) include 2,2-bis(4-glycidyloxyphenyl)hexafluoropropane and a compound expressed by formula (B-1) below.

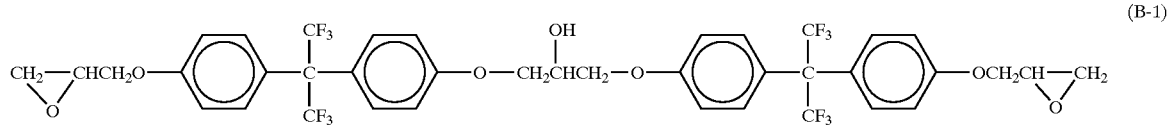

(B-1)

For the purpose of the invention, a compound expressed by general formula (C) below may also be used as compatibilizer.

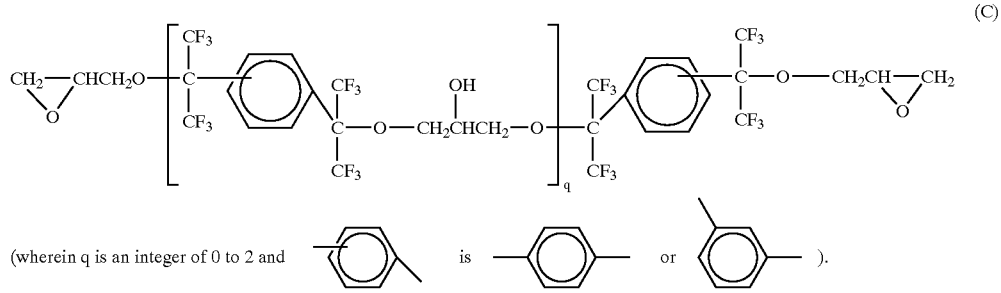

(C)

(wherein q is an integer of 0 to 2 and ⌬ is —⌬— or ⌬— ).

An example of the compound expressed by the general formula (C) is 1,4-bis(2-glycidyloxy-hexafluoroisopropyl)benzene (namely, C-1).

Since a resin composition according to the invention is of the epoxy resin type, it shows an excellent adhesiveness to a variety of members and can be cured at relatively low temperature so that it operates physically excellently as structure when cured. Additionally, since a resin composition according to the invention contains an epoxy compound containing siloxane groups, it shows a remarkably enhanced resistance to water-soluble organic solvents, particularly to polar organic solvents. When a compatibilizer as described above is added thereto, it makes the components of a resin composition according to the invention highly compatible to broaden the scope of possible combinations of candidate components.

A resin composition according to the invention is highly adapted to selectively treat the surface of the base material in the form of a pattern particularly by using as catalyst an onium salt of Lewis acid that can be activated by means of active energy rays.

The surface of a base material can be treated in the form of a pattern by applying a coating formulation containing a resin composition according to the invention to the base material, drying the applied coating formulation, subsequently irradiating the formulation with active energy rays in the form of a pattern by way of a mask and developing the exposed formulation by means of a developing solution. While the above described process is basically same as the photolithography process, a solvent or a solvent composition that can suitably be used for a resin composition is preferably selected as developing solution for the purpose of the invention. Examples of the developing solution that can be used for the purpose of the invention include aromatic hydrocarbons, ketones, esters, glycolethers and mixtures of any of them.

When the surface of the base material is treated in the form of a pattern as described above, the applied coating formulation is preferably additionally heated or irradiated with active energy rays after the development process in order to completely cure the resin composition.

As described above, an alkylsiloxane-containing epoxy resin composition according to the invention can suitably be used as water-repellent agent or water-repellent coating to be applied to an area that is apt to be brought into contact with a solution or a substance that can damage the adhesiveness of a water-repellent agent such as a polar organic solvent and also as material to be used for a water- and ink-repellence treatment of the surface of the ejection port of a liquid-jet recording head.

Thus, when a alkylsiloxane-containing epoxy resin composition according to the invention is applied to an ink-jet recording apparatus, it provides advantages including the selective modification of the surface utilizing the photopolymerizability of the composition, the high precision of the patterning process and the improvement of the device due to the enhanced solid strength and friction strength of the cured film formed in terms of durability and water- and ink-repellence, leading to a remarkable improvement in the dynamic characteristics including the meniscus retaining force of water-based ink, the cleaning ability, the accuracy of the direction of liquid ejection, the sustentation of a continuous ejection and the easiness of resumption of the printing operation after a pause. For the purpose of the present invention, the meniscus retaining force refers the effect of retaining the fluid surface of ink at the nozzle tip by surface tension while recovering and maintaining the predetermined position for the meniscus during the repeated operation of ejecting ink droplets. If the meniscus retaining force is not satisfactorily strong, there occur problems including that ink can ooze out from the nozzle tip and/or that the meniscus can retreat to reduce the volume of each droplet so that, in extreme cases, ink may not be ejected at all.

An alkylsiloxane-containing epoxy resin composition containing at least an alkylsiloxane-containing epoxy resin having two or more than two alkylsiloxane groups and two or more than two cyclic aliphatic epoxy groups in a molecule may be, for example, a polymeric compound (A) having a structural unit expressed by general formulas (a) and (b) below.

(A)

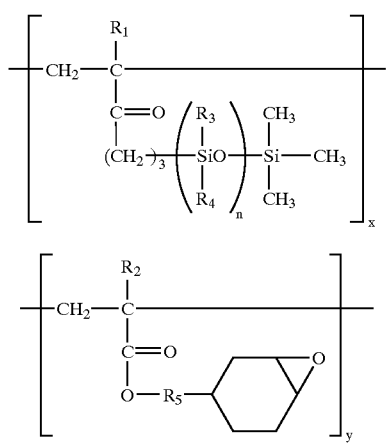

wherein
   x=1 to 50, y=2 to 100, n is an integer of 2 to 100,
   $R_1$ and $R_2$ are independently H or $CH_3$,
   $R_3$ and $R_4$ are independently $CH_3$ or phenyl,
   $R_5$ is $CH_2$, —$CH_2CH_2$— or —$CH_2CH(CH_3)$—.

When used with an oligomer, a polymeric compound having the above described structure can significantly enhance the applicability of an ink-repellent composition and improve the driability and the workability of the dried coating obtained by driving off the solvent. In other words, the compound operates also as binder. Differently stated, a composition according to the invention is preferably used with a substance having a binding effect for the purpose of producing a pattern by exposure.

While an epoxy resin composition according to the invention contains as principal ingredient alkylsiloxane, preferably, it may additionally contain a compound expressed by general formula (B) or (C) below as compatibilizer.

While a compound expressed by general formula (B) or (C) contains fluorine atoms, the chain length of the fluorine-containing part of the molecule is relatively short and hence the part does not significantly reduce the surface energy of the molecule nor exert any significant water- and ink-repellence. The compound to be used as compatibilizer can be synthetically formed by way of a reaction of the divalent alcohol and epichlorohydrin that can be realized by means of an ordinary known process.

When an epoxy resin composition according to the present invention is used for treating the surface of a base material, it is necessary to make it contain a polymerization initiator that operates as catalyst for curing the alkylsiloxane-containing epoxy resin. The polymerization initiator may be appropriately selected from substances that can cure epoxy resin. Since a composition according to the invention is an epoxy resin composition, it can be subjected to polymerization by adding an aromatic or aliphatic amine or an acid anhydride and heating/curing the composition.

However, an onium salt of Lewis acid is preferably used as catalyst because an alkylsiloxane-containing epoxy resin used in the invention is so designed as to be highly reactive to an onium salt of Lewis acid that can be activated by active energy rays having a curing effect at low temperature. By using such a catalyst, it is possible to utilize an epoxy resin composition according to the invention for a surface modifying method also according to the invention in order to treat the surface of a base material so as to accurately and selectively produce a pattern there by means of photolithography and modify the surface of the base material particularly if the latter can hardly be held to high temperature.

Examples of onium salts of Lewis acid that can be activated by means of active energy rays for the purpose of the invention include bis(4-tert-butylphenyl)iodonium salt and OPTMER SP150 and OPTMER SP170 (tradenames, available from Asahidenka Kyogyo Kabushiki Kaisha) that are respectively expressed by formulas below.

(B)

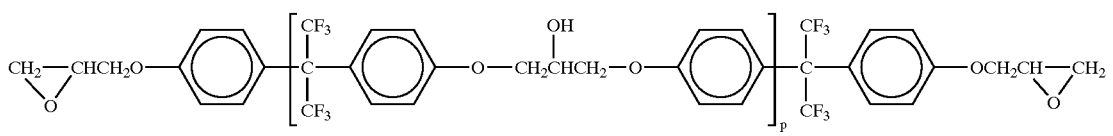

(wherein p is an integer of 0 to 2)

(C)

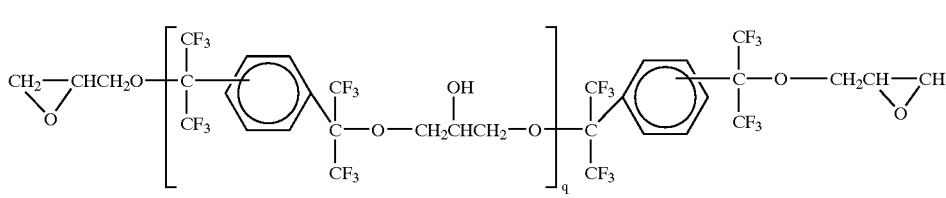

(wherein q is an integer of 0 to 2 and  is 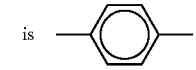 or  ).

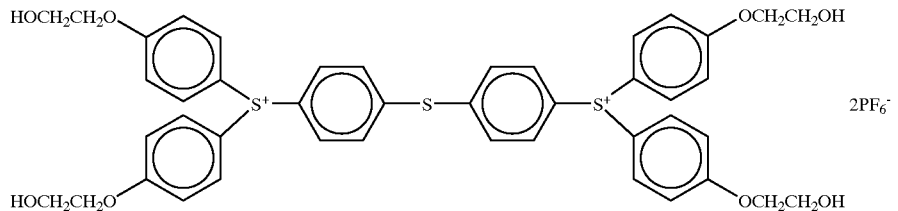

OPTMER SP-150

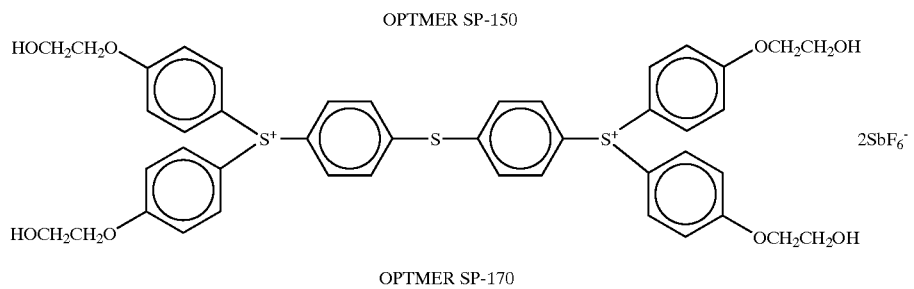

OPTMER SP-170

Additionally, "IRGACURE 261" (tradename, available from Chiba Specialty Chemicals Inc.) having a structural formula as shown below may also be used for the purpose of the invention.

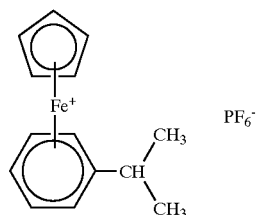

IRGACURE 261

When an epoxy resin composition according to the invention is used as material for treating the surface of a base material, it preferably contains a binder polymer as a coat forming ingredient. Polymers that can be used optimally for the purpose of the invention are epoxy polymers that can participate in a crosslinking reaction by themselves such as acrylic resins obtained by copolymerizing acryl monomers having one or more than one epoxy groups as side chains (for example, compound (X) having a structural unit expressed by formulas (d), (e) and (f) below), (X)

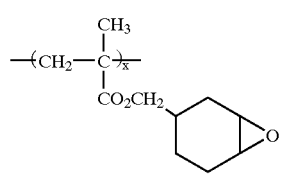
(d)

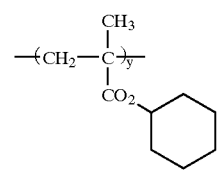
(e)

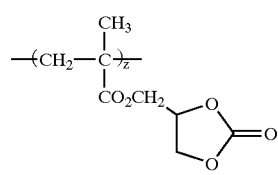
(f)

(wherein x, y and z are positive integers, preferably the ratios of x, y and z is 60, 30 and 10). Vinyl polymers obtained by polymerizing vinyl monomers having one or more than one cyclic aliphatic epoxy groups as side chains and polyether polymers having cyclic aliphatic epoxy groups as side chains (e.g., EHPE 3150: trade name, available from Daicel Kagaku). If a polymer that does not have such an epoxy group is used, it is preferable that a binder polymer is selected as polymer so that the physical properties thereof may be regulated according to the application thereof. Examples of such binder polymers that can be used for the purpose of the present invention include polymeric compounds produced for general purpose coating applications such as PKHC and PKHJ (trade names, available from Union Carbide), poly(ethylene/vinylacetate), phenol resin, polycarbonate resin, polyester resin, polyamide resin and soluble polyimde resin.

As described above, an epoxy resin composition according to the invention basically contains (1) an alkylsiloxane-containing epoxy resin, (2) a cationic polymerization catalyst and, if necessary, (3) a compatibilizer in addition to a binder polymer if it is used for the surface treatment of a base material. Note, however, that a compatibilizer of (3) is preferably be used because the remaining component compounds may show a low compatibility relative to each other and they generally show a relatively high polarity particularly when an onium salt of Lewis acid is used.

Now, the compounding ratio of the substances (1) through (3) in the composition will be described below. Firstly, the compound (2) that is a curing catalyst is contained preferably by 0.5 to 7 portions in 100 portions of the resin composition. Secondly, the compatibilizer (3) is contained by 0 to 80 portions in 100 portions of the resin composition.

If an oligomer is also used, it is impossible to define the compounding ratio because it is depending on the softening point and the glass transition temperature of the oligomer and those of the polymer. However, generally the ratio of the oligomer to the polymer is between 10:90 and 90:10 (by weight). The catalyst (2) is contained by 0.5 to 7 portions in 100 portions of the epoxy resin components.

A resin composition according to the invention and showing the above compounding ratio can suitably be used for a surface treatment agent for treating the surface of a base material by means of heating or irradiation of active energy rays. Then, the alkylsiloxane-containing epoxy resin composition according to the invention will easily be cured at relatively low temperature to provide a cured substance that is highly water- and oil-repellent, adhesive, chemical-resistant and abrasion-resistant.

When treating the surface of a base material, firstly the resin composition is dissolved in an organic solvent, which may be of the aromatic type, the aliphatic hydrocarbon type, the ester type, the ether type or the fluorine type, to obtain a coating formulation and then the obtained coating formulation is applied to the surface of the base material by means of a roll coater, a spin coater, a spray coater, screen printing, gravure printing or some other appropriate application/printing technique. If the film thickness of the applied coating formulation is as small as several microns, an ordinary precision application device such as a roller coater, a spin coater or a spray coater may preferably be used.

Then, the coating formulation applied to the surface of the base material is cured by heating it or irradiating it with active energy rays. The source of active energy rays may suitably be a mercury lamp that emits light with a large extent of line spectrum within a wavelength range between 200 and 480 nm, a laser or an electron beam source. If the coating formulation is cured by active energy rays, an optical cationic catalyst that releases Lewis acid when irradiated with light may preferably be used as catalyst. If, on the other hand, the coating formulation is cured by heating, Lewis acid such as boron trifluoride amine catalyst may be added.

The above described surface treatment process can be carried out selectively and easily without any problem by way of an operation that resembles a patterning operation using photoresist simply by so regulating the contents of the ingredients of the resin composition that a solid coat may be formed by the binder contained in the resin composition. Then, the coating formulation is applied to the surface of the base material and the solvent is removed by drying. Subsequently, the surface of the base material is irradiated with active energy rays by way of masks laid one on the other or in the form of a given pattern and then subjected to a developing process using a solvent type developing agent that can dissolve the resin composition. If the patterned irradiation of active energy rays is not sufficient for the curing, the base material is preferably subjected to a post curing process after the developing process. The energy source to be used for this post curing process may be a heating device adapted to emit heat or microwaves or an active energy source adapted to irradiate electron beams or ultraviolet rays.

Thus, a surface modifying method according to the invention provides a great advantage that it can treat the surface for water- and oil-repellence by forming a coat layer that adheres strongly to the surface of the base material and provides a satisfactory degree of hardness and durability. As a result, it is now possible to modify the surface so as to make it constantly retain a same state so that, when it is applied to an ink-jet recording head, the nozzle surface can be maintained constantly in a same state and ink would not adhere to the surface of the printing head if it is held in contact with recording liquid (ink) for a prolonged period of time. The net result will be that there is provided an ink-jet recording head that can ensure a remarkably high impact precision for dot-like droplets of ink and a high printing quality for a prolonged period of time.

Thus, when a surface modifying method according to the invention is applied to an ink-jet recording head in order to treat the nozzle surface thereof by means of a resin composition according to the invention, the treated nozzle surface will come to show such mold release characteristics that no ink would persistently adhere thereto and the residual ink, if any, can easily be removed by a cleaning operation. More specifically, the cleaning mechanism arranged on a conventional ink-jet recording head is normally adapted to wipe away the residual ink by means of a rubber blade, suck it by means of a pump or perform a blank ejection onto the surface of the head at a position off the recording paper to remove the residual ink. With any of these means, however, all the ink column pushed out of the nozzle under the ejection pressure would not be turned to droplets so that some minute droplets of ink would inevitably adhere to the nozzle and its vicinity. To the contrary, in the case of an ink-jet recording head whose surface is modified by a surface modifying method according to the invention, the nozzle shows excellent mold release characteristics and any ink that otherwise adheres to the nozzle surface would automatically drop from the surface or would be retracted into the nozzle or otherwise removed from the surface so that the ink-jet recording head is held free from any adverse effects of residual ink.

Figure 2:
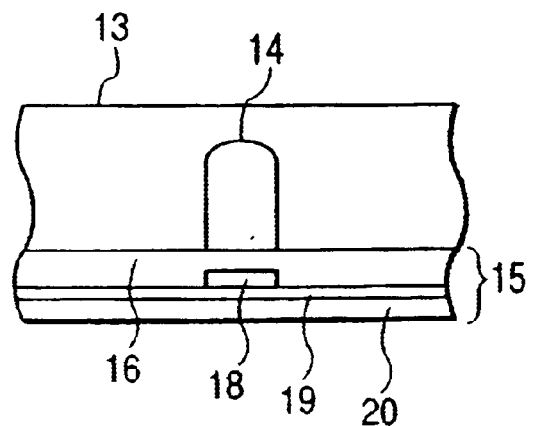
FIG. 2 is a schematic transversal cross sectional view of the head of the ink-jet recording apparatus of FIG. 1.

FIGS. 1 and 2 are schematic cross sectional views of a principal part of an embodiment of liquid-jet recording head realized by applying an alkylsiloxane-containing epoxy resin composition according to the invention. FIG. 1 is a schematic longitudinal cross sectional view taken along the ink flow path and FIG. 2 is a transversal cross sectional view showing the plane of the ejection port.

Referring to FIGS. 1 and 2, the recording head 13 comprises a base member 15 carrying thereon an ejection energy generating element and a member 14 arranged on the base member 15 and formed by molding a thermo-setting resin composition and/or an active-energy-rays-setting resin composition to provide at least a flow path and curing the compositions. More specifically, the base member 15 comprises a heat accumulating layer 19, a heat generating resister layer 18 of metal, electrodes 17-1 and 17-2 of aluminum and a protection layer 16 formed sequentially in the above mentioned order on a substrate 20 of a material that can effectively emit heat such as aluminum. With this arrangement, as the electrodes 17-1 and 17-2 are electrically energized, the ejection energy generating element formed in the region of the heat generating resister layer 18 that does not carry the electrodes (or the region indicated by n) thereon is heated and the thermal energy released therefrom acts on the recording liquid located thereabove.

For a recording operation, recording liquid 21 is filled up to orifice 22 that is a minute opening formed at an end of groove 14 and, when the electrodes 17-1 and 17-2 are electrically energized according to a recording signal applied thereto under this condition, the region indicated by n is heated abruptly so that a bubble is generated in the recording liquid 21 as a result of film boiling. Then, minute droplets 24 of recording liquid 21 are ejected out of the ejection port 22 under the pressure of the bubble and driven to fly to recording medium 25.

In the case of a liquid-jet recording head according to the invention, at least the opening of the ejection port on the ejection plane is provided with a cured alkylsiloxane-containing epoxy resin composition that operates as water- and ink-repellent agent so that any displacement of droplets relative to the direction of ejection that may arise as a result of adhesion of the droplets to the ejection port can be effectively avoided. Additionally, the cured alkylsiloxane-containing epoxy resin composition is highly adhesive and its water repellence and adhesiveness would not be damaged if the recording liquid contains an organic solvent which may be a polar organic solvent.

Figure 3:
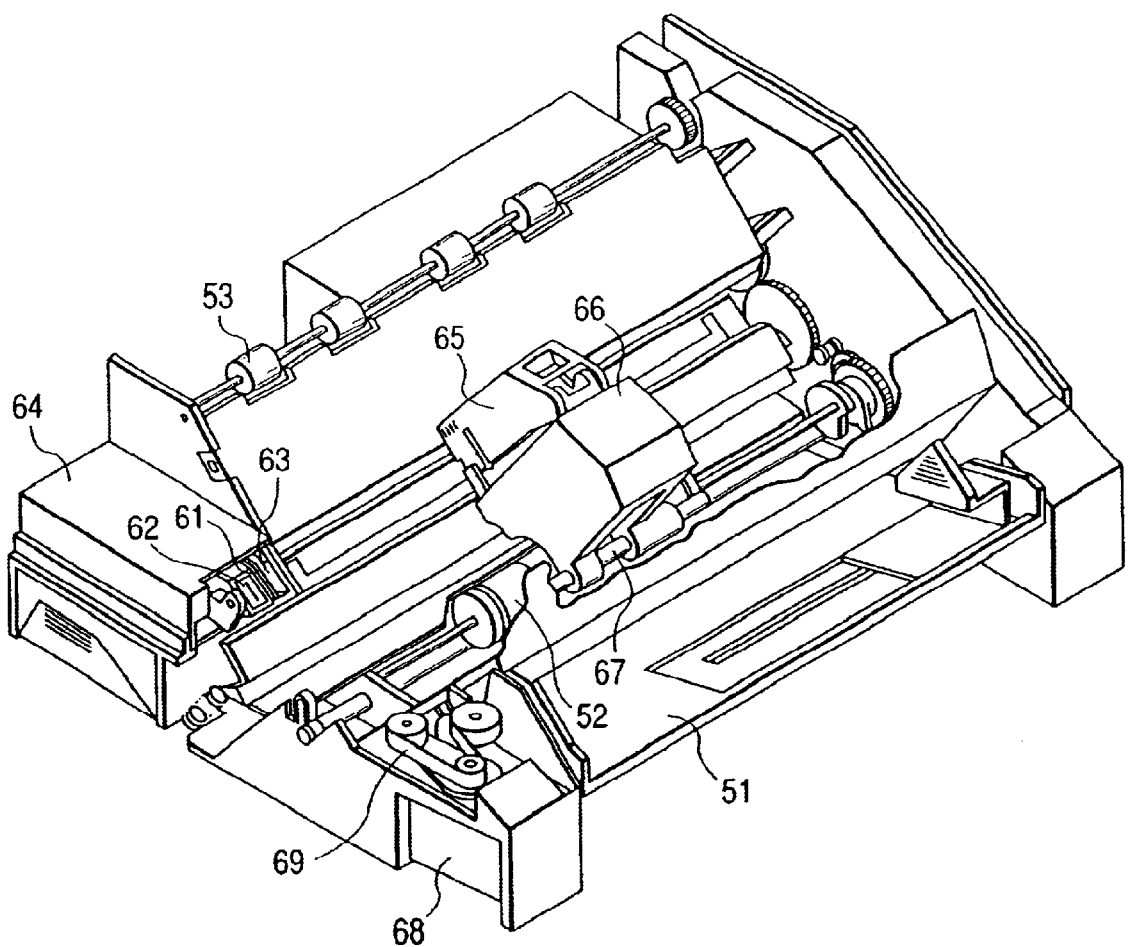
FIG. 3 is a schematic perspective view of an ink-jet recording apparatus.

FIG. 3 is a schematic perspective view of an embodiment of liquid-jet recording apparatus according to the invention and comprising a multi-head as shown in FIG. 2. Referring to FIG. 3, the embodiment comprises a blade 61 adapted to operate as wiping member and having an end rigidly secured by means of a blade holding member so as to make it operate as a cantilever. The blade 61 is arranged at a position adjacent to the recording region relative to the home position of the recording head. Additionally, in the case of this embodiment, it will be appreciated that the blade 61 is held so as to project into the track of the recording head. In FIG. 3, reference numeral 62 denotes a cap arranged at the home position of the recording head and located adjacently relative to the blade 61. It is adapted to move in a direction perpendicular to the moving direction of the recording head so that it can abut and cap the ejection port. Reference numeral 63 denotes an ink absorbent arranged at a position adjacent to the blade 61 and so held as to project into the track of the recording head like the blade 61. The blade 61, the cap 62 and the ink absorbent 63 form an ejection restoring section 64 for the embodiment and moisture and dirt are removed from the plane of the ink ejection port by the blade 61 and the ink absorbent 63.

Referring still to FIG. 3, reference numeral 65 denotes the recording head of the embodiment adapted to recording by means of a liquid-jet system. It may typically-be so designed as to eject recording liquid such as ink by means of thermal energy as described above by referring to FIGS. 1 and 2. Reference numeral 66 denotes a carriage carrying the recording head 65 and adapted to move the latter. The carriage 66 is slidably held in engagement with a guide 67 and, although not shown, partly connected to a belt 69 that is driven to move by a motor 68. With this arrangement, the carriage 66 can be moved along the guide shaft 67 so that the recording head 65 can be moved to the recording region and a region adjacent to it.

Reference numeral 51 denotes a feeding section for feeding the recording medium to the recording head 65 and reference numeral 52 denotes a feed roller that is driven by a motor (not shown). With this arrangement, the recording medium is fed to a position vis-a-vis the plane of the ejection port of the recording head and gradually delivered to the outside by delivery roller 53 as the recording operation proceeds.

Note that the cap 62 of the ejection restoring section 64 is retracted from the track of the recording head 65 but the blade 61 is projecting into the track when a recording session is terminated and the recording head 65 is returned to the home position. As a result, the plane of the ejection port of the recording head 65 is wiped for cleaning. Additionally, the cap 62 is moved to project into the track of the recording head 65 when it is made to abut the plane of the ejection port of the recording head 65 in order to cap the ejection port.

The cap 62 and the blade 61 are caused to restore the respective positions described above for a wiping operation when the recording head 65 is moved from the home position to the position for starting a recording session. As a result, the plane of the ejection port is wiped during the movement of the recording head 65.

Note that the movement of the recording head to the home position takes place not only at the time of termination of a recording session and that of restoration of ejection but also at predetermined intervals during the movement of the recording head to the recording region that is located adjacent to the home position so that the above described wiping operation is repeated each time the recording head returns to the home position.

In an ink-jet recording apparatus adapted for color recording, ejection ports for cyan, magenta, yellow and black may be arranged in line in a single recording head. Alternatively, they may be arranged in respective recording heads that are also placed in line. In any case, ink of each color may be ejected from a single ejection port or simultaneously from a plurality of ejection ports. Additionally, it may be so arranged that two or more than two droplets of a same color hit the recording medium simultaneously.

Since an ink-jet recording head according to the invention is subjected to a surface treatment operation using an epoxy resin composition according to the invention that contains the above described components and operates effectively for ink-repellence, the treated surface shows the chemical properties as described hereinafter by referring to examples and ink for ink-jet operations would hardly adhere thereto. Differently stated, the ink adhering to the surface, if any, can be easily wiped away by the cleaning wiper blade so that the quality of printing is remarkably improved and the improved quality can be maintained for a prolonged period of time.

Now, specific methods for treating the surface of the base material of the ejection port of an ink-jet recording head according to the invention in the form of a given pattern will be described below in detail.

Figure 4A:
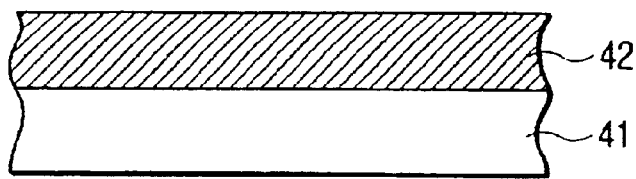
FIGS. 4A, 4B, 4C, 4D and 4E are schematic conceptual illustrations of a surface modifying method according to the invention, illustrating different steps thereof.
Figure 4B:
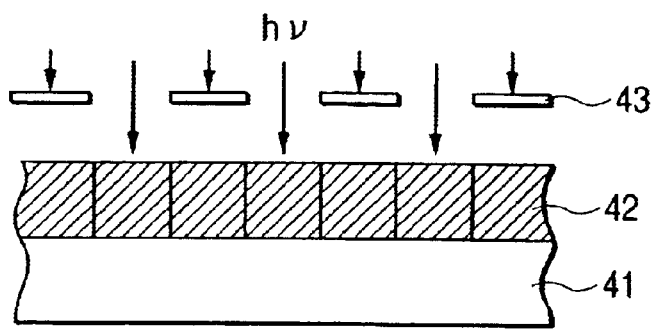
Figure 4C:
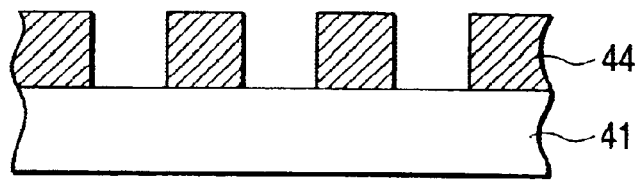

According to a first method of treating the surface in the form of a given pattern, a coating formulation containing an epoxy resin composition according to the invention is applied to the base material (FIG. 4A) and then selectively irradiated with active energy rays by using a mask or in the form of the given pattern (FIG. 4B). Subsequently, the surface is subjected to a developing process using a developing solution (FIG. 4C). While the processing steps of this method are basically identical with those of a photolithography process, a solvent or a solvent composition adapted to the applied resin composition may preferably be selected for the developing solution. Examples of substances that can be used for the developing solution include aromatic hydrocarbons, ketones, esters, glycolethers and mixtures of any of them. Preferably, after the development process, the coat is heated or irradiated with active energy rays in order to completely terminate the chemical reaction of the resin composition.

A second method of treating the surface in the form of a given pattern according to the invention comprises (1) a step of applying a coating formulation containing an epoxy resin composition according to the invention to the surface of the base material, (2) a step of irradiating the entire surface with heat or active energy rays to encourage polymerization and curing of the composition and (3) a step of irradiating the surface with decaying active energy rays to selectively remove the cured composition from desired sites. An ultraviolet ray source adapted to abundantly emit rays with a wavelength between 250 and 480 millimicrons is typically used to produce active energy rays that promote polymerization. An excimer laser adapted to emit rays with a wavelength less than 210 millimicrons is typically used as source of decaying active energy rays. With the second method, it is desirable to irradiate the surface with active energy rays in any of the above steps in order to promote the heat treatment process and the polymerization process.

As described above in detail, an alkylsiloxane-containing epoxy resin composition according to the invention can suitably be used for a water-repellent agent or a water-repellent coating that is applied to a site apt to be brought into contact with a solution or a substance such as a polar organic solvent that can damage the adhesiveness of the water-repellent agent and also as a material for treating the plane of the ejection port of the liquid-jet recording head for water- and ink-repellence.

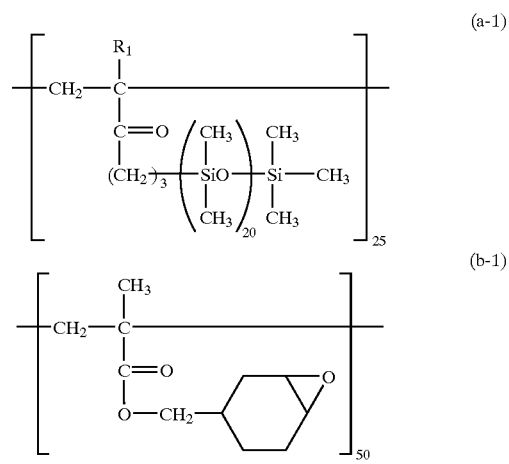

catalyst 1: OPTMER SP-150

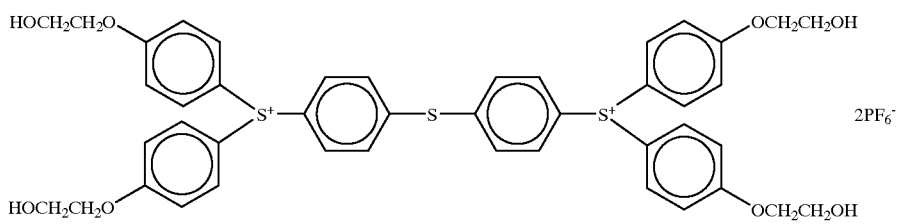

catalyst 2: OPTMER SP-170

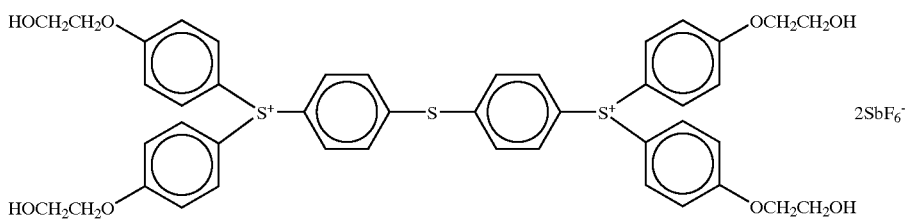

compatibilizer: (B-1)

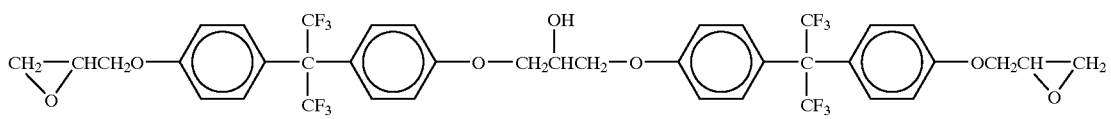

Now, the present invention will be described further by way of examples and comparative examples. Examples 1 through 4

Firstly, the four compounds expressed by the respective formulas as shown below were prepared as resin compositions of Examples 1 through 4 (Composition Examples 1 through 4). Note that the ratios shown below are those by weight of the respective solid components.

(Composition Example 1)
   A-1: catalyst 1=96:4
(Composition Example 2)
   A-1: catalyst 2=94:6
(Composition Example 3)
   A-1: catalyst 2: B-1=95:5:25
(Composition Example 4)
   A-1: catalyst 2: B-1: C-1=80:5:25:25 (A-1): having structural units as expressed by (a-1) and (b-1) shown below.

Evaluation

Firstly, Resin Composition Examples 1 through 4 obtained in Examples 1 through 4 above were used and each added into diethylene glycol dimethyl ether/toluene mixture solvent (1:1) until the resin composition shows a concentration of 30 to 40% by weight in order to prepare so many coating formulations. Then, each of the prepared coating formulations is applied to a silicon wafer substrate having a 5 micron thick thermally oxidized film by means of a spinner to a thickness of 1 to 3 microns in a wet state. Subsequently, the substrate is heated on a hot plate at 110° C. for 5 minutes to dry and remove the solvent. Then, the substrate was irradiated with ultraviolet rays to an accumulated dose of 2 J/cm$^2$ by means of an ultraviolet ray irradiation apparatus using a high voltage mercury lamp. Thereafter, the substrate was heated to 50° C. for 15 minutes in a furnace to complete the cure reaction.

The substrates having the surfaces treated in a manner as described above was observed to see the modified state of the surface and evaluated by using the following rating systems.

(T1: Measurement of Contact Angle)

The static contact angle T1 of each of the substrates was measured by using pure water, a 10% aqueous solution of oleic acid, a 20% aqueous solution of glycerin and a 1% aqueous solution of a surfactant (polyoxyethylene nonyl phenyl ether: HLB=10) at room temperature. Table 2 shows the obtained results.

(T2: Measurement of Contact Angle of Ink after Immersing in an Aqueous Solution of Dye)

A 3% aqueous solution (pH=10.3) of Direct Black 168 which is a water soluble dye was used as ink and the contact angle (T2) of the ink was measured. Additionally, the substrates treated for ink-repellence were immersed in the ink at 60° C. for 7 days. Thereafter, the substrates were washed with pure water and dried and their contact angles (T2) of the ink were measured once again. Table 2 shows the obtained results.

(T3: Long Term Printing Durability Test)

Figure 4D:
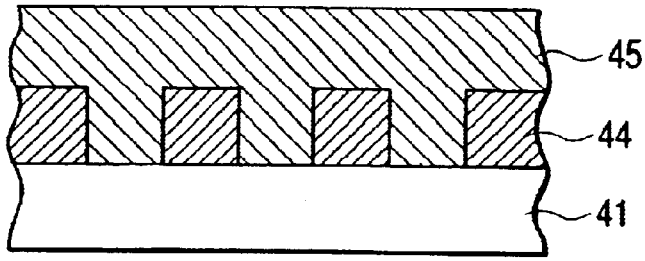

Positive type photoresist PMERAR-900 (tradename, available from Tokyo Ouka Company) was applied to each of the base members 41 to be treated that had been made to carry thereon an ejection energy generating element and other elements in advance as shown in FIG. 4A to a thickness of 30 μm by spin coating and then the base member was pre-baked in an oven at 90° C. for 40 minutes to form a resist layer 42. The resist layer 42 was then selectively irradiated with ultraviolet rays by way of a mask 43 to form a resist pattern 44 as shown in FIGS. 4A and 4B. Then, a mixture obtained by mixing a principal agent as shown below and a curing agent (Fujicure FXK830 (modified aliphatic amine): tradename, available from Fujikasei Kogyo Kabushiki Kaisha) to a ratio of principal agent/curing agent=100:50) was laid on the resist pattern to a film thickness of 100 μm as shown in FIG. 4D. Table 1 shows the composition of the principal agent used for the test.

TABLE 1

Two-part type epoxy resin composition-primary components

| Composition | Weight part |
|---|---|
| Eipcoat 828 (mfd. by Yukashell Epoxy Kabushiki Kaisha) | 75 |
| 1,3-bis(3-glycidoxypropyl) tetramethyldisiloxane | 25 |
| NUC silane coupling agent A-187 (mfd. by NIPPON UNICAR CO. LTD) | 5 |

Figure 4E:
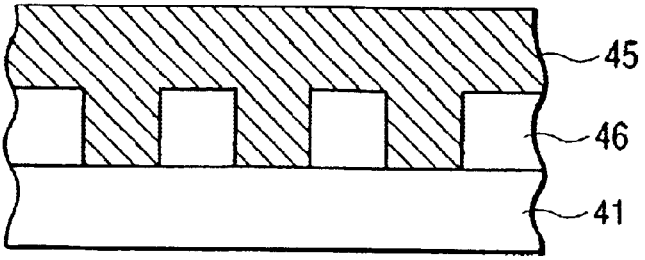

After laying the flow path forming material layer 45 in a manner as described above, each of the specimens was left at 25° C. for 24 hours in atmosphere and then thermally cured at 100° C. for 2 hours. The obtained multilayer structure is then immersed in an aqueous solution containing sodium hydroxide by 3 wt % to dissolve and remove the resist pattern 44 as shown in FIG. 4E and subsequently cleansed and dried to obtain a liquid-jet recording head having a flow path 46.

Then, the alkylsiloxane-containing epoxy resin compositions of Examples 1 through 4 were respectively applied to the planes of the ejection ports of the obtained specimens of liquid-jet recording head. Thereafter, the composition on each of the specimens was cured by irradiating them with ultraviolet rays to an accumulated dose of 8 J/cm² and heating them to 150° C. for 1 hour.

Thereafter, each of the liquid-jet recording heads that had been surface-treated was mounted in a printer and electrically properly wired. Then, the liquid-jet recording head was subjected to a long term printing durability test, using ink adapted to ink-jet and containing pure water, glycerol, hood black 2 (water-soluble black dye) and N-methylpyrrolidone to a ratio of 70:15:3:12 (by weight). The test was conducted by printing a document and a pattern designed for the evaluation of impact precision on 100 sheets of paper. Finally, the distortion of the printed dots was observed by referring to a sample print. The rating system as shown below was used for evaluation. Table 2 shows the obtained results in the column of T3-1.

Rating A: No displacement of dot positions. Printed characters were clear.

Rating B: Slight displacement of dot positions. Printed characters were only slightly affected by the displacement.

Rating C: Considerable displacement of dot positions. Printed characters were poorly clear.

Rating D: A considerable number of dots were missing. Printed characters were of a poor quality.

Additionally, the surface of each of the recording heads used for the long term printing durability test was observed after the test and the ink adhesion was evaluated by using the rating system shown below. Table 2 shows the obtained results in the column of T3-2.

Rating A: Ink droplets were scarcely observable on the nozzle surface.

Rating B: small ink droplets were observable on the nozzle surface.

Rating C: Large ink droplets were observable at and near the ejection port of the nozzle.

Comparative Example 1

Fluorad™ FC-722 (fluoro-coating agent, available from Sumitomo 3M) was applied to the plane of the ejection port of the recording head in place of the alkylsiloxane-containing epoxy resin composition of Examples and dried at 100° C. for 30 minutes for surface treatment. A base member was prepared under the above curing conditions and T1 through T3 were observed for evaluation as in the case of Examples. Table 2 shows the obtained values.

Comparative Example 2

A compostion prepared by using a bisphenol F having a chemical structure as shown below which is containing epoxy resin was evaluated for T1 through T3 as in the case of Examples. Table 2 shows the obtained values.

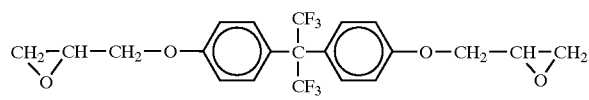

TABLE 2

| | Result of evaluation | | | | | | | |
|---|---|---|---|---|---|---|---|---|
| | T1 (Contact angle:degree) | | | | T2 (Immersion test) | | T3 (Durability test) | |
| Composition | Pure water | Oleic acid | Glycerin | Surfactant | before | after | T3-1 | T3-2 |
| Ex. 1 | 95 | 83 | 95 | 88 | 96 | 87 | A | B |
| Ex. 2 | 100 | 88 | 100 | 85 | 102 | 89 | A | A |
| Ex. 3 | 103 | 92 | 105 | 86 | 105 | 85 | B | A |
| Ex. 4 | 105 | 95 | 108 | 90 | 108 | 90 | A | A |
| Comp. Ex. 1 | 90 | 72 | 90 | 85 | 90 | 74 | C | C |

TABLE 2-continued

Result of evaluation

| Composition | T1 (Contact angle:degree) | | | | T2 (Immersion test) | | T3 (Durability test) | |
|---|---|---|---|---|---|---|---|---|
| | Pure water | Oleic acid | Glycerin | Surfactant | before | after | T3-1 | T3-2 |
| Comp. Ex. 2 | 93 | 78 | 93 | 83 | 88 | 73 | C | C |

As clearly seen from Table 2, a resin composition according to the invention showed a large contact angle and an excellent durability. Additionally, ink would not adhere to the surface treated by the composition if the surface Is held in contact with ink for a prolonged period of time so that ink droplets showed an excellent level of impact precision and the recording head whose surface was treated by the resin composition could maintain a high printing quality for a prolonged period of time.

Example 5

The composition of Example 1 and that of Example 3 were applied to respective molded base plate members of polyethersulfon by means of a spinner to a film thickness of about 2 microns as observed after evaporating the Solvent. The base members were then irradiated with beams of light by weans of a high voltage mercury lamp to a total accumulated dose of 10 J/cm² for the purpose of polymerization. Thereafter, the base members were irradiated from above with an excimer laser beam having a wavelength of 195 millimicrons and converged to show a beam diameter of 5 microns to produce a nozzle opening. A satisfactory opening war produced in each of the base members with little decomposition residue remaining along the edge. As a result, it was proved that an epoxy resin composition according to the invention can be processed satisfactorily by an ultraviolet laser.

As described above in detail, according to the invention, there is provided an alkylsiloxane-containing epoxy resin composition that can suitably be used as water-repellent agent or a water-repellent coating to be advantageously applied to areas that are apt to be brought into contact with solutions and substances containing one or more than one components that can damage the film forming property and the adhesion of an ordinary water-repellent agent.

Additionally, according to the invention, there is provided an alkylsiloxane-containing epoxy resin composition that is adapted to modify the surface of a base material so as to make it constantly show a same surface condition.

Furthermore, according to the invention, there is provided an ink-jet recording head having a nozzle surface that constantly shows a same surface condition so that ink would not adhere to the surface of the recording head if it is held in contact with recording liquid (ink) for a prolonged period of time and hence ink droplets ejected therefrom would show an excellent level of impact precision. Such an ink-jet recording head can enjoy a high printing quality for a prolonged period of time. Finally, according to the invention, there is provided a liquid-jet recording apparatus comprising such a recording head.

What is claimed is:

1. A surface modifying method for selectively treating the surface of a base member comprising:
   a first step of applying a coating formulation containing a resin composition to the surface of the base member and drying the coating formulation;
   a second step of irradiating the entire surface with active energy rays by way of a mask or in the form of a pattern;
   a third step of dissolving and removing the parts of said resin composition unirradiated with active energy rays by means of a liquid adapted to dissolve said resin composition; and
   a fourth step of conducting a post curing operation whenever necessary;
   said resin composition being an alkylsiloxane-containing epoxy resin composition comprising:
   (i) an alkylsiloxane-containing epoxy resin having two or more than two alkylsiloxane groups and two or more than two cyclic aliphatic epoxy groups in a molecule;
   (ii) a cationic polymerization catalyst;
   (iii) an acrylic resin having one or more than one epoxy groups as side chains, said acrylic resin being represented by the following formula (X):

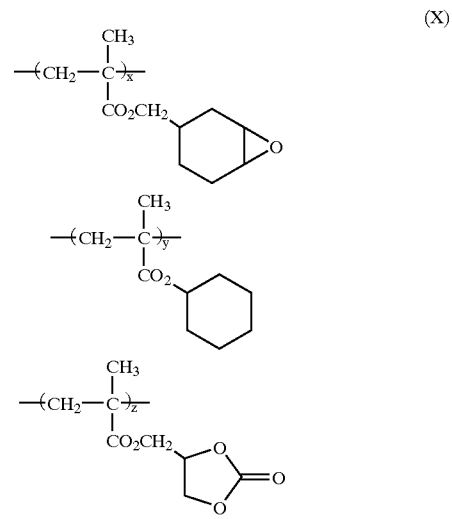

where x, y and z are positive integers.

2. The surface modifying method of claim 1, wherein the alkylsiloxane containing epoxy resin is a polymeric compound (A) having a structural unit expressed by general formulas (a) and (b) below:

(A)

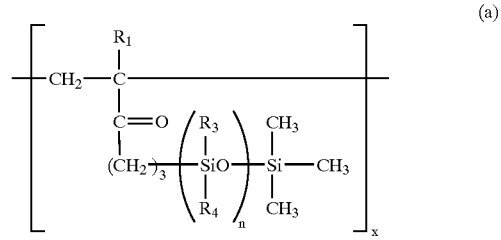

-continued

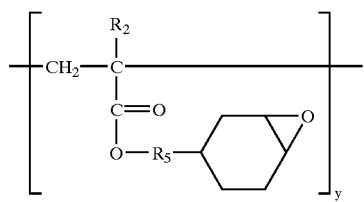

(b)

Wherein:

x=1 to 50, y=2 to 100, n is an integer of 2 to 100, $R_1$ and $R_2$ are independently H or $CH_3$, $R_3$ and $R_4$ are independently $CH_3$ or phenyl, $R_5$ is $CH_2$, —$CH_2CH_2$— or —$CH_2CH(CH_3)$—.

3. The surface modifying method of claim 1, wherein the alkylsiloxane-containing epoxy resin composition further comprises a compound having a general structure (B) or (C) as shown below as compatibilizer;

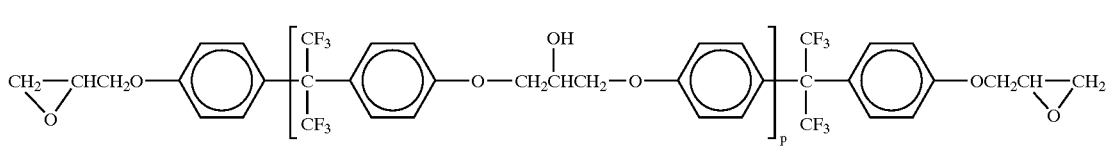

(B)

(wherein p is an integer of 0 to 2)

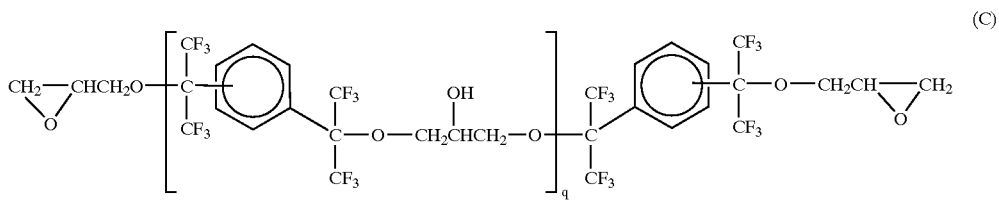

(C)

(wherein q is an integer of 0 to 2 and

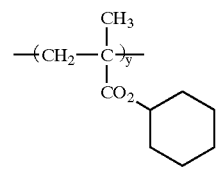 is 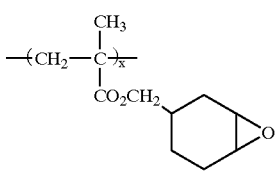 or 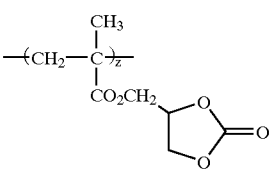 ).

4. A surface modifying method for selectively treating the surface of a base member comprising:

a first step of applying a coating formulation containing a resin composition to the surface of the base member and drying the coating formulation;

a second step of polymerizing and curing the resin composition by irradiating it with heat or ultraviolet rays;

a third step of selectively removing the resin composition by means of an excimer laser; and a fourth step of conducting a post curing operation whenever necessary;

said resin composition being an alkylsiloxane-coating epoxy resin composition comprising:

(i) an alkylsiloxane-containing epoxy resin having two or more than two alkylsiloxane groups and two or more than two cyclic aliphatic epoxy groups in a molecule;

(ii) a cationic polymerization catalyst;

(iii) an acrylic resin having one or more than one epoxy groups as side chains, said acrylic resin being represented by the following formula (X):

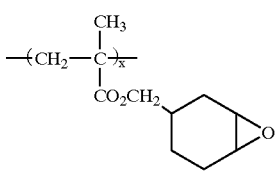

(X)

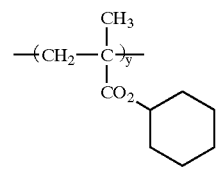

-continued

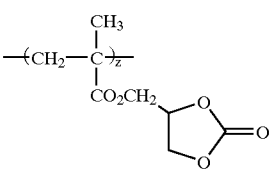

where x, y and z are positive integers.

5. The surface modifying method of claim 4, wherein the alkylsiloxane-containing epoxy resin is a polymeric compound (A) having a structural unit expressed by general formulas (a) and (b) below:

(A)

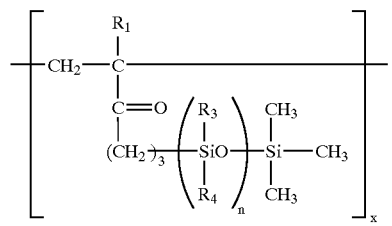

(a)

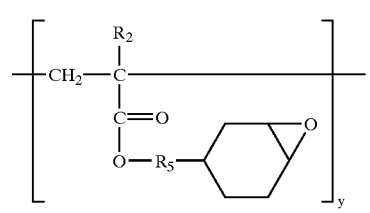

(b)

Wherein:

x=1 to 50, y=2 to 100, n is an integer of 2 to 100, $R_1$ and $R_2$ are independently H or $CH_3$, $R_3$ and $R_4$ are independently $CH_3$ or phenyl, $R_5$ is $CH_2$, —$CH_2CH_2$— or —$CH_2CH(CH_3)$—.

6. The surface modifying method of claim 4, wherein the alkylsiloxane-containing epoxy resin composition further comprises a compound having a general structure (B) or (C) as shown below as compatibilizer:

7. An ink-jet recording head having an ejection port for ejecting recording liquid and coated with a cured film of an alkylsiloxane-containing epoxy resin composition at least at the opening of the ejection port, wherein the alikysiloxane-containing epoxy resin composition comprises:

(i) an alkylsiloxane-containing epoxy resin having two or more than two alkylsiloxane groups and two or more than two cyclic aliphatic epoxy groups in a molecule;

(ii) a cationic polymerization catalyst; and (iii) an acrylic resin having one or more than one epoxy groups as side chains, said acrylic resin being represented by the following formula (X):

(X)

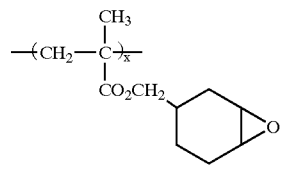

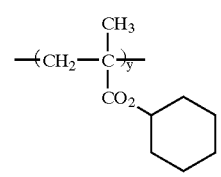

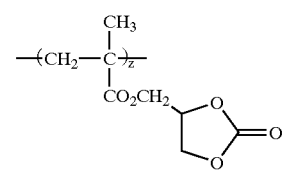

where x, y and z are positive integers.

(B)

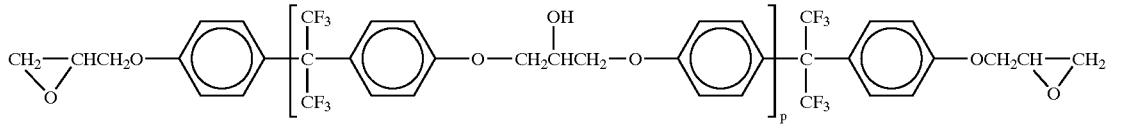

(wherein p is an integer of 0 to 2)

(C)

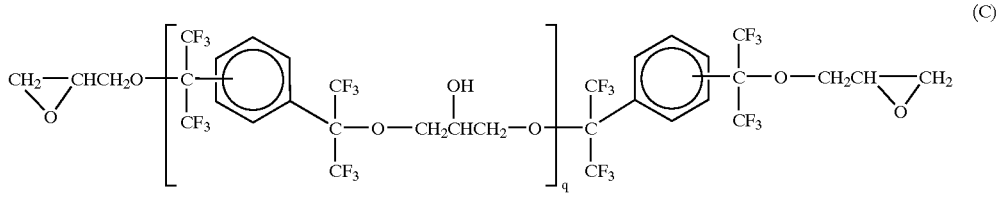

(wherein q is an integer of 0 to 2 and 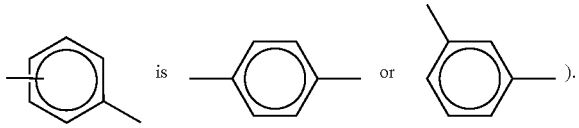 ).

8. The ink-jet recording head according to claim 7, wherein the alkylsiloxane-containing epoxy resin is a polymeric compound (A) having a structural unit expressed by general formulas (a) and (b) below:

(A)

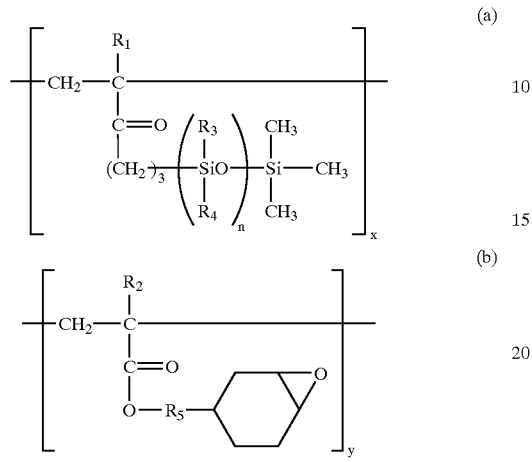

Wherein:
x=1 to 50, y=2 to 100, n is an integer of 2 to 100,
$R_1$ and $R_2$ are independently H or $CH_3$,
$R_3$ and $R_4$ are independently $CH_3$ or phenyl,
$R_5$ is $CH_2$, —$CH_2CH_2$— or —$CH_2CH(CH_3)$—.

9. The ink-jet recording head according to claim 7, wherein the alkylsiloxane-containing epoxy resin composition further comprises a compound having a general structure (B) or (C) as shown below as compatibilizer:

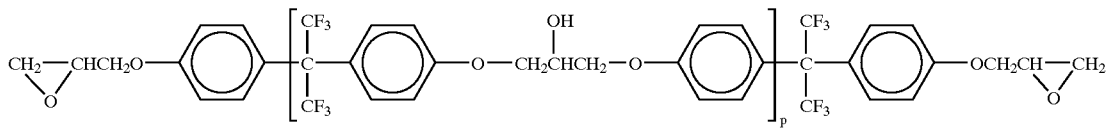

(wherein p is an integer of 0 to 2)

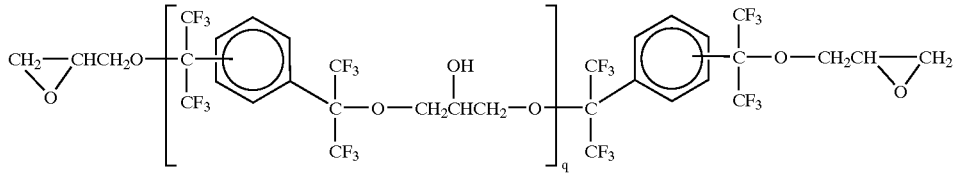

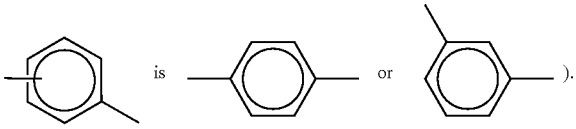

10. A liquid-jet recording apparatus comprising an ink-jet recording head according to claims 7 to 9.

* * * * *

UNITED STATES PATENT AND TRADEMARK OFFICE
CERTIFICATE OF CORRECTION

PATENT NO. : 6,713,128 B2
APPLICATION NO. : 10/389931
DATED : March 30, 2004
INVENTOR(S) : Akihiko Shimomura et al.

It is certified that error appears in the above-identified patent and that said Letters Patent is hereby corrected as shown below:

COLUMN 1
Line 12, "invention/relates" should read --invention relates--.

COLUMN 13
Line 43, "typically-be" should read --typically be--.

COLUMN 18
Line 27, "small" should read --Small--.
Line 42, "containing" should read --fluorine-containing--.

COLUMN 19
Line 17, "Is" should read --is--.
Line 30, "Solvent" should read --solvent--.
Line 32, "weans" should read --means--.

COLUMN 20
Line 52 (Claim 2, Line 2), "alkylsiloxane containing" should read
--alkylsiloxane-containing--.

COLUMN 24
Line 4 (Claim 7, Line 4), "alikysiloxane-" should read --alkylsiloxane- --.

Signed and Sealed this

Twenty-second Day of May, 2007

JON W. DUDAS
*Director of the United States Patent and Trademark Office*